(12) United States Patent
Pogorelik et al.

(10) Patent No.: US 10,621,977 B2
(45) Date of Patent: Apr. 14, 2020

(54) TRUSTED SPEECH TRANSCRIPTION

(71) Applicant: McAfee, LLC., Santa Clara, CA (US)

(72) Inventors: Oleg Pogorelik, Lapid (IL); Alex Nayshtut, Gan Yavne (IL); Igor Muttik, Berkhamsted (GB); Adi Shaliv, Nir-Banim (IL)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 14/928,749

(22) Filed: Oct. 30, 2015

(65) Prior Publication Data

US 2017/0125014 A1    May 4, 2017

(51) Int. Cl.
| | | |
|---|---|---|
| *G10L 15/07* | (2013.01) | |
| *G06F 16/61* | (2019.01) | |
| *G06F 16/683* | (2019.01) | |
| *G06F 21/64* | (2013.01) | |
| *G06F 21/10* | (2013.01) | |
| *G06F 21/32* | (2013.01) | |
| *G10L 15/26* | (2006.01) | |
| *G10L 17/24* | (2013.01) | |
| *G10L 25/51* | (2013.01) | |

(52) U.S. Cl.
CPC ............. *G10L 15/07* (2013.01); *G06F 16/61* (2019.01); *G06F 16/685* (2019.01); *G06F 21/10* (2013.01); *G06F 21/32* (2013.01); *G06F 21/64* (2013.01); *G10L 15/26* (2013.01); *G10L 17/24* (2013.01); *G10L 25/51* (2013.01); *G06F 2221/0744* (2013.01); *G06F 2221/2107* (2013.01)

(58) Field of Classification Search
CPC ....................................................... G10L 15/26
USPC .......................................................... 704/235
See application file for complete search history.

(56) References Cited

U.S. PATENT DOCUMENTS

| | | | |
|---|---|---|---|
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,855,106 B1* | 10/2014 | Nachnani | H04L 65/1069 370/352 |
| 9,237,232 B1* | 1/2016 | Williams | H04M 3/4936 |
| 9,633,696 B1* | 4/2017 | Miller | G11B 27/105 |
| 2003/0004724 A1 | 1/2003 | Kahn et al. | |
| 2007/0083367 A1 | 4/2007 | Baudino et al. | |

(Continued)

FOREIGN PATENT DOCUMENTS

WO       2017074600       5/2017

OTHER PUBLICATIONS

International Search Report and Written Opinion issued in PCT/US2016/052377 dated Dec. 28, 2016; 14 pages.

*Primary Examiner* — Jakieda R Jackson
(74) *Attorney, Agent, or Firm* — Patent Capital Group

(57) ABSTRACT

Embodiments include a system, method, and apparatus for creating a trusted speech transcription. Transcription logic can receive a signal of audible speech from an audio source and convert the audible speech signal into text. Sampling logic can receive the signal of the audible speech and record a portion of the of the audible speech as a digital audio recording of the audible speech. Packaging logic can create a trusted speech transcription data record that includes the text and the digital audio recording and to digitally sign the transcription file to securely associate the text with the digital audio recording.

16 Claims, 7 Drawing Sheets

(56) References Cited

U.S. PATENT DOCUMENTS

| | | | | |
|---|---|---|---|---|
| 2007/0198330 A1* | 8/2007 | Korenblit | G06Q 10/06316 | 705/7.42 |
| 2009/0276215 A1* | 11/2009 | Hager | G06F 17/273 | 704/235 |
| 2009/0306981 A1* | 12/2009 | Cromack | G06F 17/30743 | 704/235 |
| 2010/0158213 A1* | 6/2010 | Mikan | H04M 3/42221 | 379/88.14 |
| 2011/0087491 A1* | 4/2011 | Wittenstein | G10L 15/26 | 704/235 |
| 2011/0276325 A1 | 11/2011 | Tatum et al. | | |
| 2011/0287748 A1* | 11/2011 | Angel | H04M 3/42221 | 455/414.1 |
| 2012/0259635 A1* | 10/2012 | Ekchian | G06Q 50/18 | 704/235 |
| 2013/0030802 A1 | 1/2013 | Jia et al. | | |
| 2013/0058471 A1* | 3/2013 | Garcia | H04M 3/42221 | 379/202.01 |
| 2013/0121580 A1* | 5/2013 | Chen | G06Q 10/063 | 382/182 |
| 2013/0132092 A1 | 5/2013 | Cabezas et al. | | |
| 2013/0266127 A1* | 10/2013 | Schachter | G10L 25/48 | 379/88.01 |
| 2013/0325462 A1* | 12/2013 | Somekh | G06F 17/30265 | 704/235 |
| 2014/0163978 A1* | 6/2014 | Basye | G10L 15/28 | 704/233 |
| 2014/0350924 A1* | 11/2014 | Zurek | G10L 15/22 | 704/231 |
| 2015/0003595 A1* | 1/2015 | Yaghi | G06Q 10/063 | 379/85 |
| 2016/0155443 A1* | 6/2016 | Khan | G06F 1/3203 | 704/275 |
| 2016/0165044 A1* | 6/2016 | Chan | H04M 3/42221 | 455/413 |

* cited by examiner

TRUSTED SPEECH TRANSCRIPTION

FIELD

This disclosure pertains to creating a trusted transcription of audible speech.

BACKGROUND

Speech recording for internal auditing and compliancy to legal regulations is common practice in modern call centers, conferencing, and collaboration solutions. Raw recorded data is stored in formats such as MP3, WAV, etc. that pose challenges for search, filtering, and advanced processing of the content (such as print, copy into the document, create reports, citation, etc.). It also requires more storage than transcribed text after speech-to-text conversion which is often employed to, simultaneously, avoid storing lots of raw data and allow easy indexing and searches. Additionally, after converting live speech to text, the record loses personal attributes, so that the transcribed record cannot be reliably linked to the original voice(s). As a result the voice transcription cannot be used in legal and business cases relying on voice identification.

DETAILED DESCRIPTION

This disclosure describes creating a non-repudiable link between transcribed speech and the original (non-transcribed) voice record. This can be done by linking text fragments with corresponding voice record fragments in a file format or session container with a trusted signing of the transcription pair (e.g., {speech recording, transcribed text}).

The disclosure is based on linking transcription with reliable/trusted audio record sources to make identifying the speaker easier to accomplish. The resulting transcription pair is digitally signed along with an identification of the speaker obtained from either conferencing system (such as Lync ID, etc.) or OS login ID that will proof record authenticity. In some implementations, the speech transcription can be run in a trusted execution environment (TEE).

Figure 1:
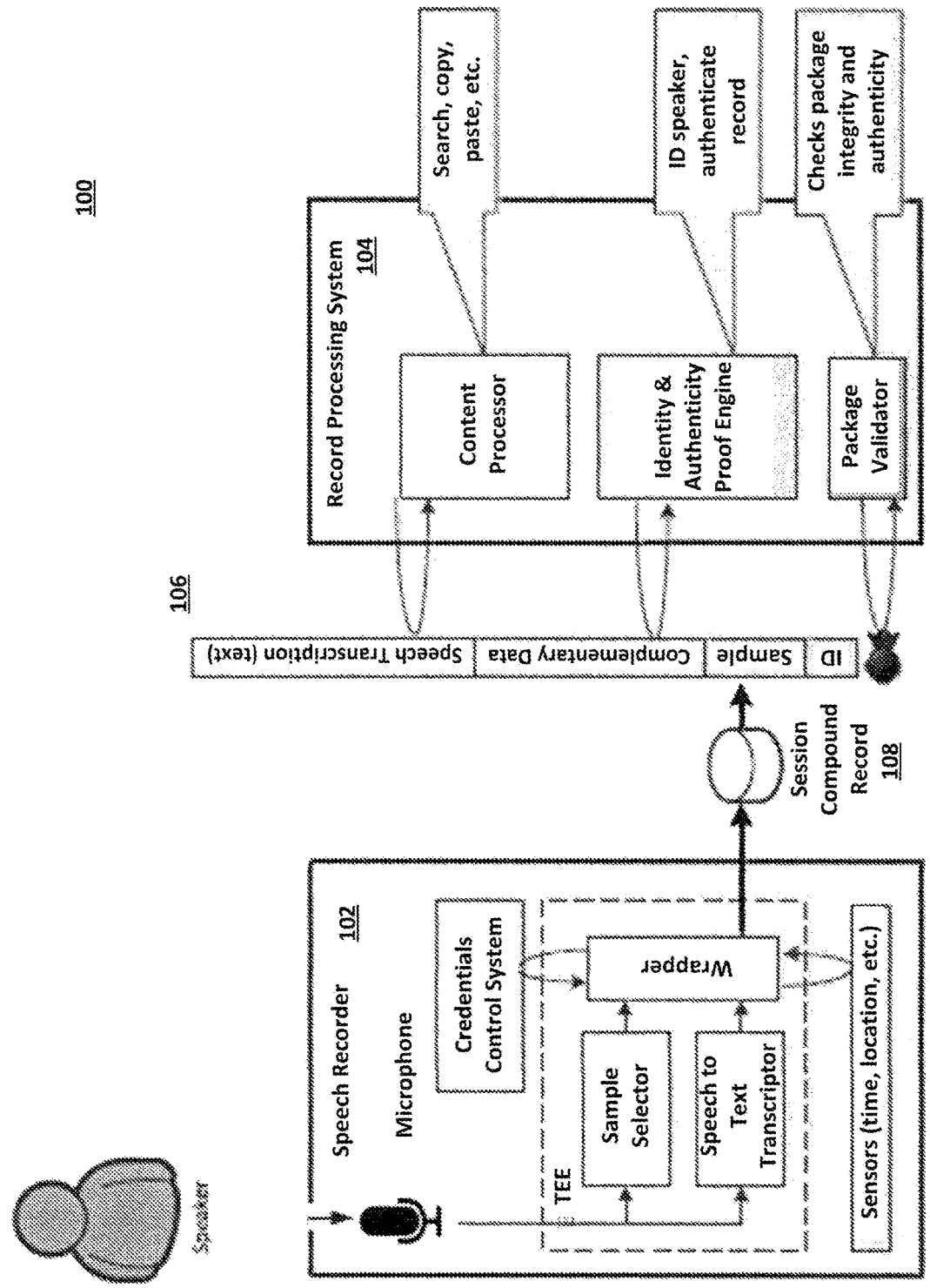
FIG. 1 is a schematic block diagram of a system for providing a trusted speech transcription in accordance with embodiments of the present disclosure.

FIG. 1 is a schematic block diagram of a system 100 for providing a trusted speech transcription in accordance with embodiments of the present disclosure. The system 100 includes a speech recorder 102 that receives audible speech from a speaker and creates the trusted speech transcription data record 106. The trusted speech transcription data record 106 can be stored in a session compound record 108. A record processing system 104 can "consume" or "process" the new trusted speech transcription data record 106. Each of the speech recorder 102, the record processing system 104, and the trusted speech transcription data record 106 are described in more detail in FIGS. 2-4 below.

Figure 2:
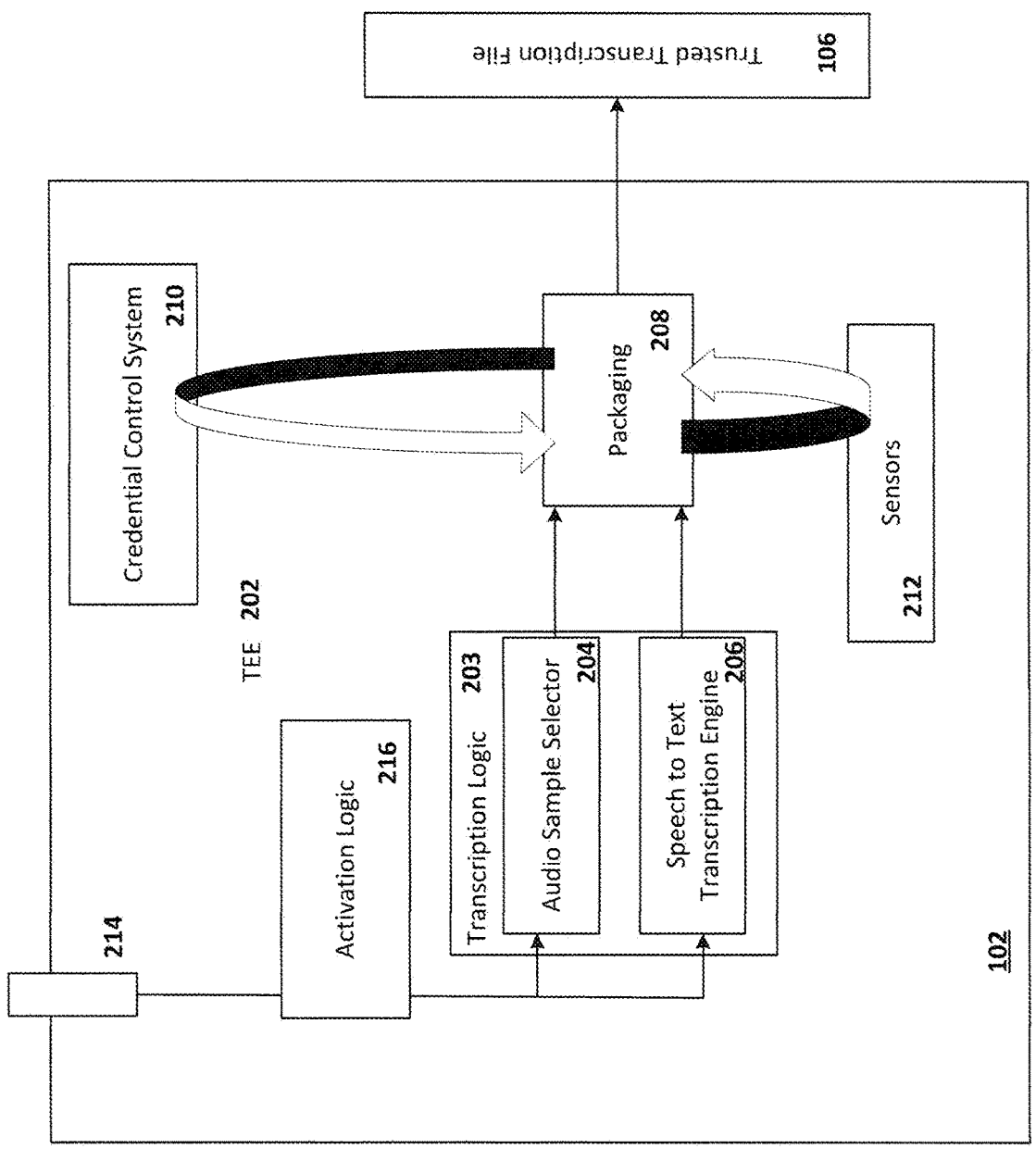
FIG. 2 is a schematic block diagram of a speech recorder in accordance with embodiments of the present disclosure.

FIG. 2 is a schematic block diagram of a speech recorder 102 in accordance with embodiments of the present disclosure. Speech recorder 102 can be a stand-alone device or can be integrated into a computer, cellular phone, tablet, other hand-held device, cameras, microphones, or other devices used to record audible speech electronically.

Speech recorder 102 includes a trusted execution environment (TEE) 202 in which transcription and recording of received audible speech signals occurs. The TEE 202 includes transcription logic 203 that includes an audio sample selector 204 and a speech to text transcriptor (STT) 206. Audio sample selector 204 can be implemented at least partially in hardware, but also in software (or both). The audio sample selector 204 can receive signals representing received audible speech (e.g., via microphone 214) and record the signals as digital audio. The audio sample selector 204 can also identify samples of recorded audio for association with corresponding transcribed text for packaging. In some embodiments, speech recorder 102 can also filter background noise, including other speakers, from the audible speech to create a recording indicative of the voice of the speaker of the audible speech.

The speech-to-text transcriptor (STT) 206 (e.g., transcription engine) can be implemented at least partially in hardware, but also in software (or both). The STT 206 can be configured with language and acoustics models to generate transcription from speech.

TEE 202 also includes a packaging element 208, which can be implemented at least partially in hardware, but also in software (or both). The packaging element 208 can include a transcription packaging engine that generates the trusted speech transcription data record 106. The packaging element 208 receives the transcribed text from the STT 206 (e.g., the output of the transcription engine) and receives a corresponding representative sample of the original speech input, and creates a new transcription file. The packaging element 208 can then digitally sign the transcription file that includes both the voice recording and the corresponding text together to create non-repudiable linkage between the text and the voice record in a single file.

The packaging element 208 can be a "smart" packaging element that creates a trusted speech transcription data record 106 based on specific audible speech samples that can be used to verify or authenticate the speaker. For example, the packaging element 208 can package audio samples that have sufficient clarity to identify the speaker or that only have one speaker speaking or are of sufficient length that a speaker can be identified via voice cues. The packaging element 208 can then package specific audio samples representative of the speaker's voice with corresponding transcripted speech to create the trusted speech transcription data record 106.

The packaging element 208 can interface with a credential control system 210 for digital signature information, encryption information, and other security protocol information to create a trusted speech transcription data record 106. The packaging element 208 can use a digital signature, for example, to secure the contents of the trusted speech transcription data record so that the contents of the file cannot be altered. For example, the digital signature prevents a dissociation of the recorded speech from the corresponding transcribed text. The security of the trusted speech transcription data record ensures that the voice record can be used to authenticate the speaker and the corresponding transcribed text. In some embodiments, the credential control system 210 can interface with the TEE 202 to provide security and encryption credentials based on private key material associated with the TEE 202.

The packaging element 208 can also communicate with various sensors 212. Sensors 212 can be used to augment the trusted speech transcription data record 106 with metadata, such as the date/time of the speech, the identity of the speaker, the location of the speaker, as well as other identifying characteristics, such as an IP address of the speaker, a login credential, and e-mail address or phone number used as part of a collaboration or online meeting space, etc.

The packaging element 208 can receive continuous audio recordings and text transcriptions. The packaging element 208 can also receive discrete snippets of audio recordings and associated text. The packaging element 208 can package into the transcription file a predetermined number of snippets or a predetermined amount of data. The packaging element 208 can also communicate with activation logic 216 to start creating new trusted speech transcription data records, as described more below.

In some embodiments, the speech recorder 102 can include a microphone 214. In some cases, the speech recorder 102 can include an interface for an external microphone.

In some embodiments, the speech recorder 102 can include activation logic 216. The activation logic 216 can be used to identify audible speech that is suitable for reliably identifying the source of the audible speech (e.g., a speaker). For example, the activation logic 216 can trigger the transcription logic to begin transcribing speech and recording a representative record when certain parameters are satisfied, such as a clarity of the audible speech signal, the determination that only a single speaker is speaking, the determination that a specific speaker is speaking, etc.

The activation logic 216 can receive signals from the microphone 214 representing audible speech. The activation logic 216 can process the signals for certain keywords or phrases. Upon detecting certain keywords or phrases, the activation logic 216 can trigger the audio sample selector 204 and the STT 206 to record and transcribe, respectively, the signals representing the audible speech. In some instances, the activation logic 216 can process the signals representing audible speech to identify a change in the speaker of the audible speech. A change in the speaker of the audible speech can also cause the audio sample selector and STT to start a new trusted speech transcription data record. The activation logic 216 can interface with the packaging element 208 to instruct the packaging element 208 when to start a new transcription file.

Figure 3:
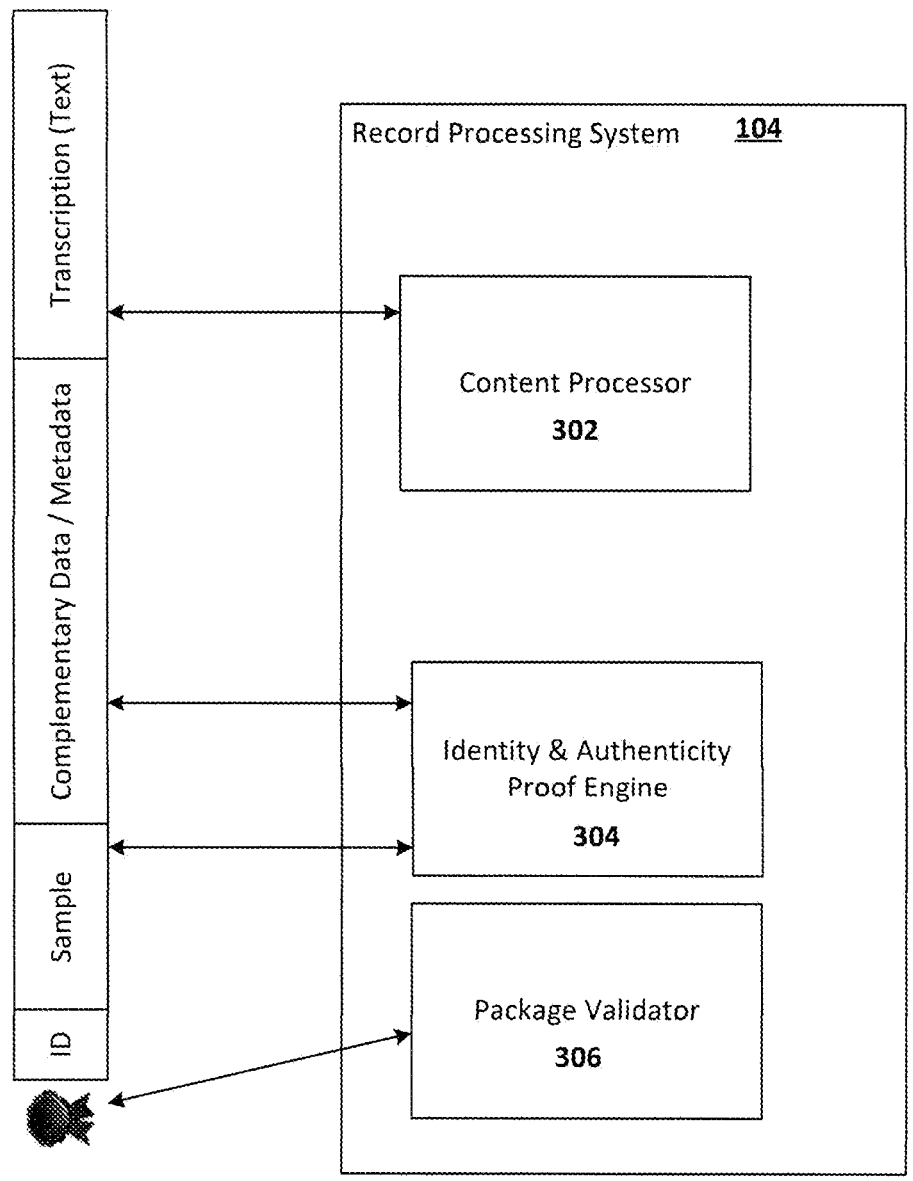
FIG. 3 is a schematic block diagram of a record processor in accordance with embodiments of the present disclosure.

FIG. 3 is a schematic block diagram of a record processor 104 in accordance with embodiments of the present disclosure. Record processor 104 can include a content processor 302, an identity & authenticity proof engine 304, and a package validator 306. The record processor 104 can process trusted encryption files (such as trusted encryption file 106).

Content processor 302 can access the content of the trusted encryption file 106, such as the audio recording for playback. The content processor 302 can also handle text processing requests, such as search record by word, phrase, etc.

The record processing system 104 also includes an identity & authenticity proof engine (IAPE) 304. The IAPE 304 can check the speaker's identity by, for example, using bound credentials & recorded the recorded speech sample. The IAPE 304 will be able to compare the recorded speech file to other recorded or live speech of the same person and identify if the speakers are the same person or not.

The record processing system 104 also includes a package validator 306. Package validator 306 verifies the trusted speech transcription data record 106 authenticity by checking the TEE digital signature on the trusted speech transcription data record 106.

Figure 4:
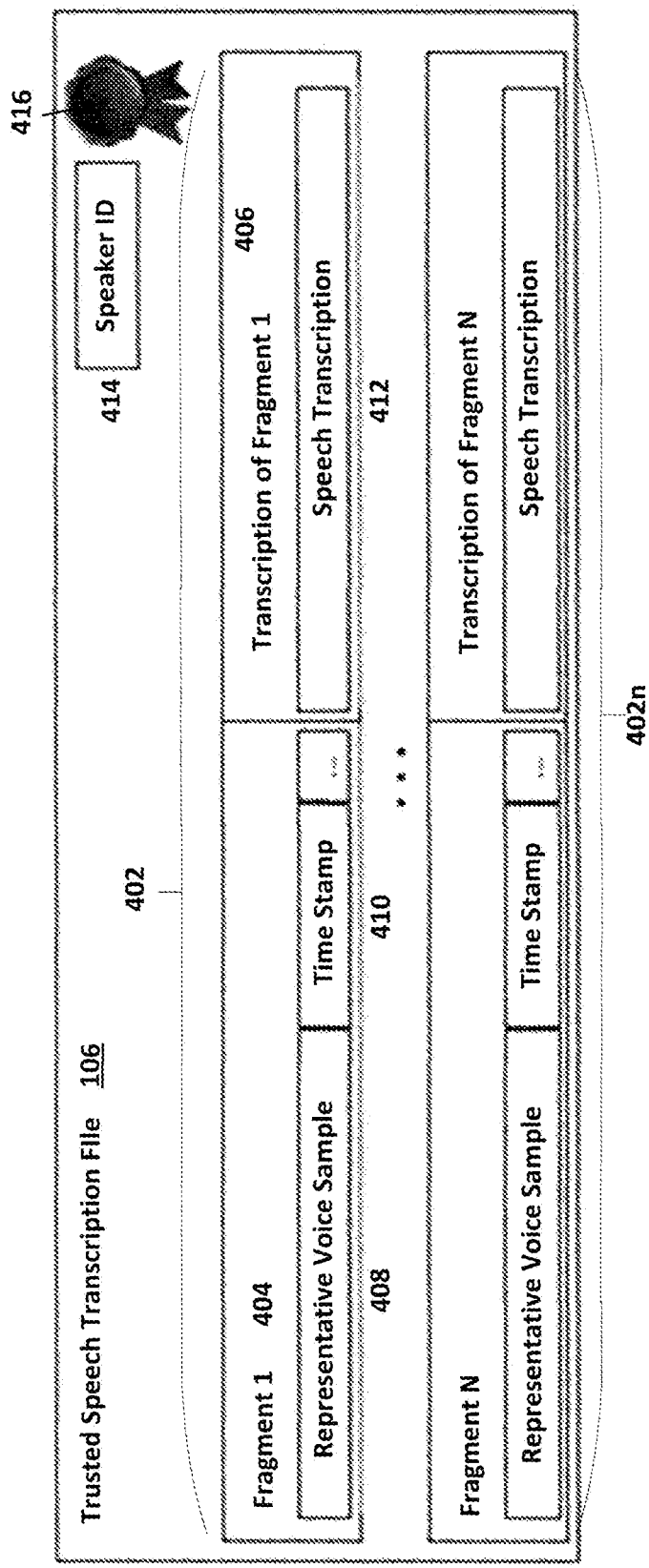
FIG. 4 is a schematic block diagram of a trusted speech transcription data record in accordance with embodiments of the present disclosure.

FIG. 4 is a schematic block diagram of a trusted speech transcription data record 106 in accordance with embodiments of the present disclosure. The example trusted speech transcription data record 106 can include one or more transcription pairs 402-402n. Each transcription pair 402-402n includes a first portion 404 and a second portion 406.

The first portion 404 includes a representative voice sample 408 that is representative of recorded audible speech and is representative of the transcribed text 412 of the audible speech (found in the second portion 406). As already mentioned the second portion 406 includes the speech transcription 412. In some embodiments, the first portion 404 can also include metadata 410 about the audible speech, such as a data/time stamp, an IP address of the source of audible speech, a user name for logging into a meeting or collaboration site, etc.

The trusted speech transcription data record 106 also includes an identification of the speaker of the audible speech 414. The trusted speech transcription data record 106 can be packaged such that each transcription pair 402-402n includes transcripted speech 412 and a representative voice sample 408 from a single speaker. For example, if a speaker is having a conversation with another person, the discontinuous speech from that speaker can be stored in a single transcription file 106 as multiple transcription pairs 402-402n, each transcription pair 402-402n representing, e.g., a different sentence or a different topic in the conversation. In some instances, a single transcription pair 402 can be used that includes the entirety of the speakers audible speech.

The trusted speech transcription data record 106 is also includes a digital signature 416. The digital signature is added in the TEE 102 after the transcription pair 402 is created. The digital signature 416 secures the transcription pair so that the representative voice sample 408 is linked to the transcribed speech 412 in a non-repudiable way. That is, the representative voice sample 408 can be used to verify the speaker of the corresponding transcribed speech text 412.

Figure 5:
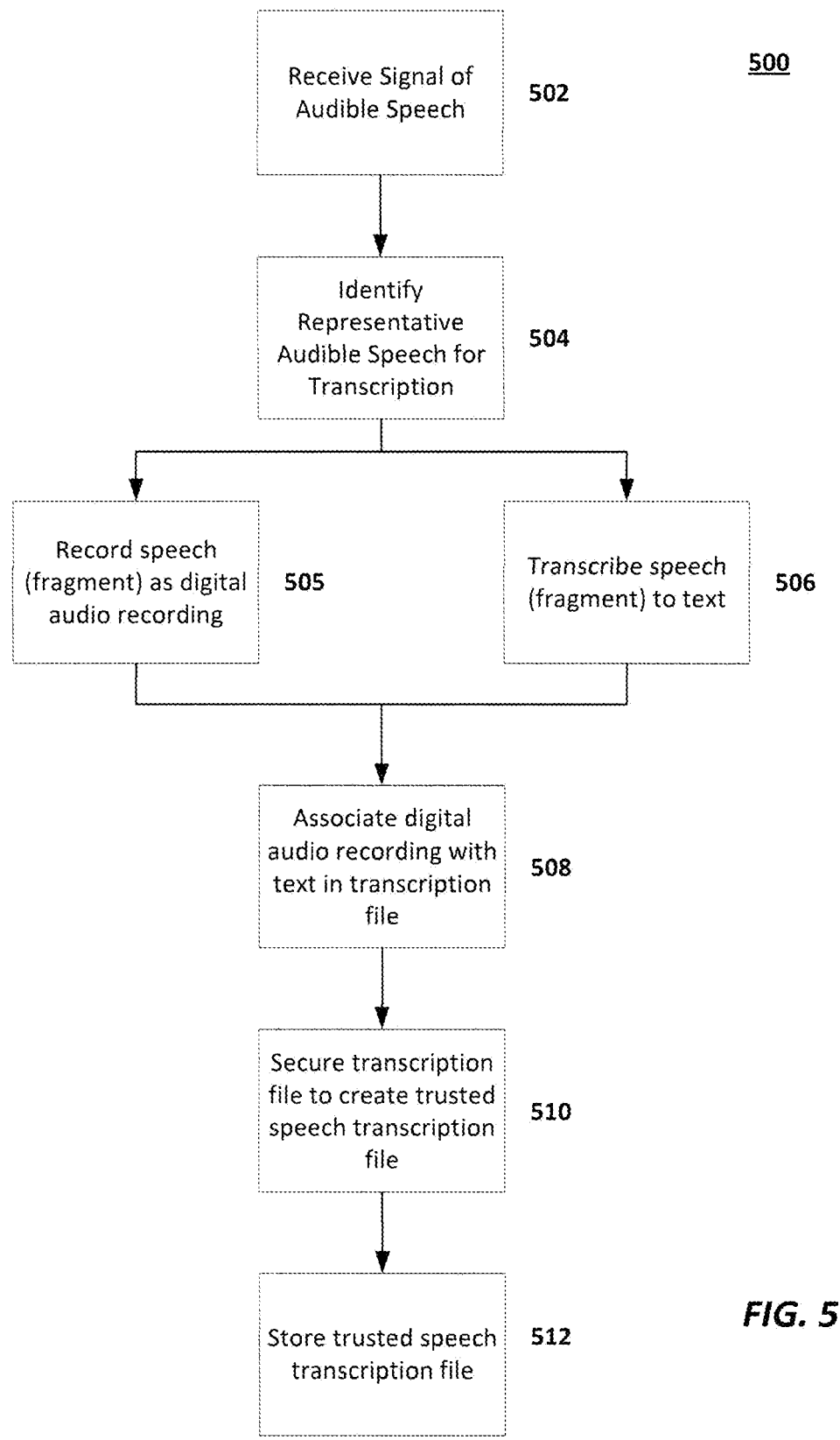
FIG. 5 is a process flow diagram for creating a trusted speech transcription in accordance with embodiments of the present disclosure.

FIG. 5 is a process flow diagram 500 for creating a trusted speech transcription in accordance with embodiments of the present disclosure. A signal representing audible speech is received (502). In some cases, this original speech record can be processed by an activation logic for identifying clarity of speech, identity of speaker, length of audible speech, etc. In some cases, the original signal can be sliced into sections (e.g. sentences) for processing.

At least one of the voice fragments (or several) is selected as representative of the identity of the speaker (504). For example, the voice fragment can be considered non-repudiable as an identification of the speaker because e.g., the voice fragment is suitable for speaker(s) identification.

All or part of the signal representing audible speech can be recorded (505).

All or some part of the speech will be transcribed into text form (506). The speech can be transcribed into another format supporting search, editing, etc.

The audio recording and the transcribed speech can be associated into at least one transcription pair {speech, text} to create a speech transcription data record (508).

The speech transcription data record containing the transcription pair is digitally signed or otherwise secured (510), which creates a trusted speech transcription data record. In some cases, if there are more than one transcription pairs, each transcription pair can be digitally signed; or the entire speech transcription data record can be digitally signed, or both.

The trusted speech transcription data record (including the transcription pair(s) and digital signature(s)) are saved for future use (512). The trusted speech transcription data record can be used to searching, citation, reporting, forensic, identification, attribution, etc. Signing could be implemented as a trusted engine running in a trusted execution environment (TEE) (for the cases where transcription is performed on a speaker's machine) as well as an external trusted (in a PKI sense) signing service (convenient for cloud servers).

The solution provides the following benefits:

A reduction in storage requirements for raw speech data.

Increased integrity and authenticity assurances for stored data.

Allows identification of (all) the speaker(s).

Supports advanced content processing cases such as search and filtering by words, phrases, copy-paste citation, reporting, forensic analysis, etc.

Allows easy sharing of signed data while maintaining guarantees of authenticity, integrity and non-repudiability.

Allows creating automated word processing systems with high level of trust (suitable for government, military, law, financial domains)

Accelerate speech processing (×10-100) by avoiding operations over raw speech data Stored speech data will be potentially suitable as evidence in a court of law to the extent that authenticity can be verified by voice recordings combined with digital signature security.

In general, "servers," "devices," "computing devices," "host devices," "user devices," "clients," "servers," "computers," "systems," etc., can include electronic computing devices operable to receive, transmit, process, store, or manage data and information associated with the computing environment. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

Host and user devices, including some implementations of gateway devices, can further include computing devices implemented as one or more local and/or remote client or end user devices, such as personal computers, laptops, smartphones, tablet computers, personal digital assistants, media clients, web-enabled televisions, telepresence systems, gaming systems, multimedia servers, set top boxes, smart appliances, in-vehicle computing systems, and other devices adapted to receive, view, compose, send, or otherwise interact with, access, manipulate, consume, or otherwise use applications, programs, and services served or provided through servers within or outside the respective device. A host device can include any computing device operable to connect or communicate at least with servers, other host devices, networks, and/or other devices using a wireline or wireless connection. A host device, in some instances, can further include at least one graphical display device and user interfaces, including touchscreen displays, allowing a user to view and interact with graphical user interfaces of applications, tools, services, and other software. It will be understood that there may be any number of host devices, as well as any number of host devices. Further, the term "host device," "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers, among other examples.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this specification.

In example 1, aspects of the embodiments are directed to a trusted speech transcription apparatus for creating a trusted speech transcription data record. The trusted speech transcription apparatus includes a transcription logic implemented at least partially in hardware to receive a signal of audible speech from an audio source and to convert the signal into text. The apparatus may also include sampling logic implemented at least partially in hardware to receive the signal of the audible speech and to record signal of audible speech as a digital audio recording of the audible speech. The apparatus may also include packaging logic implemented at least partially in hardware to create the trusted speech transcription data record that includes the text and the digital audio recording and to digitally sign the trusted speech transcription data record to securely associate the text with the digital audio recording.

In example 2, the subject matter of example 1 can also include that the packaging logic implemented at least partially in hardware tags the transcription file with metadata associated with the audible speech.

In example 3, the subject matter of example 2 can also include that the metadata comprises one or more of a time stamp, an internet protocol (IP) address of the audio source, an identification of a speaker of the audible speech, or an identifier of the source of the audible speech.

In example 4, the subject matter of any of examples 1 or 2 or 3 can also include that activation logic implemented at least partially in hardware can activate the transcription logic implemented at least partially in hardware and the sampling logic implemented at least partially in hardware upon detecting a triggering event.

In example 5, the subject matter of example 4 can further include that the triggering event is the reception by the activation logic implemented at least partially in hardware of a predetermined word or phrase.

In example 6, the subject matter of any of examples 1 or 2 or 3 or 4 can also include that the transcription logic implemented at least partially in hardware converts the signal of the audible speech and the sampling logic implemented at least partially in hardware records the signal representing audible speech substantially in parallel.

In example 7, the subject matter of any of examples 1 or 2 or 3 or 4 or 6 can also include that the sampling logic implemented at least partially in hardware records a fragment of the signal representing audible speech and the digital audio recording is a recording of the fragment of the audible speech, the fragment of the audible speech representative of a source of the audible speech.

In example 8, the subject matter of example 6 can also include that the fragment of the audible speech comprises quality characteristics to identify a speaker of the audible speech.

In example 9, the subject matter of any of examples 8 or 9 can also include that the fragment of the audible speech is stored with a corresponding transcription of the audible speech.

In example 10, aspects of the embodiments are directed to a record processing apparatus for processing information in a trusted speech transcription session wrapper. The record processing apparatus includes a content processor implemented at least partially in hardware to process text representing a transcribed audio signal, a package validator implemented at least partially in hardware to authenticate the trusted speech transcription data record, and an identity proof engine implemented at least partially in hardware to compare text with a corresponding voice record fragment, both of which are contained in the trusted speech transcription data record, and to identify a speaker of the voice record fragment.

In example 11, the subject matter of example 10 may further include that the package validator authenticates the trusted speech transcription data record with a digital signature.

In example 12, the subject matter of any of examples 10 or 11 may further include that identity proof engine identifies the speaker of the voice record fragment by comparing the voice record fragment with recorded speech by speaker.

In example 13, the subject matter of any of examples 10 or 11 or 12 may further include that the content processor is configured to receive a search request for a word of a phrase and to execute a text search of the word or phrase.

In example 14, aspects of the embodiments include a computer program product tangibly embodied on a non-transitory computer readable medium, the computer program product including instructions that are operable when executed to receive a signal of audible speech from an audio source; identify a portion of the audio source suitable for creating a trusted speech transcription data record (e.g., the identity of the speaker can be ascertained from the portion of the audio source), convert the signal into text; record the signal of audible speech as a digital audio recording of the audible speech; and create the trusted speech transcription data record that includes the text and the digital audio recording and to digitally sign the trusted speech transcription data record to securely associate the text with the digital audio recording.

In example 15, the subject matter of examples 14 may further include that the instructions are further operable to tag the transcription file with metadata associated with the audible speech.

In example 16, the subject matter of any of examples 14 or 15 may further include that the metadata comprises one or more of a time stamp, an internet protocol (IP) address of the audio source, an identification of a speaker of the audible speech, or an identifier of the source of the audible speech.

In example 17, the subject matter of any of examples 14 or 15 or 16 may further include that the instructions are further operable to activate transcription and recording upon detecting a triggering event.

In example 18, the subject matter of example 17 may further include that the triggering event is the reception of a predetermined word or phrase.

In example 19, the subject matter of any of examples 14 or 15 or 16 or 17 may further include that the instructions are further operable to convert the signal of the audible speech and to record the signal representing audible speech substantially in parallel.

In example 20, the subject matter of any of examples 14 or 15 or 16 or 17 or 19 may further include that the instructions are further operable to record a fragment of the signal representing audible speech and the digital audio recording is a recording of the fragment of the audible speech, the fragment of the audible speech representative of a source of the audible speech.

In example 21, the subject matter of any of examples 14 or 15 or 16 or 17 or 19 or 20 may further include that the fragment of the audible speech comprises quality characteristics to identify a speaker of the audible speech.

In example 22, the subject matter of any of examples 14 or 15 or 16 or 17 or 19 or 20 or 21 may further include that the fragment of the audible speech is stored with a corresponding transcription of the audible speech.

In example 23, aspects of the embodiments are directed to a method performed in a trusted execution environment, the method including receiving a signal of audible speech from an audio source; identifying a representative sample that is suitable for identification of the speaker, converting the signal into text and recording the signal of audible speech as a digital audio recording of the audible speech; and creating the trusted speech transcription data record that includes the text and the digital audio recording and to digitally sign the trusted speech transcription data record to securely associate the text with the digital audio recording.

In example 24, the subject matter of example 23 may further include starting converting the signal into text and recording the signal of audible speech as a digital audio recording based on receiving a triggering event.

In example 25, the subject matter of any of example 23 or 24 may further include that creating the trusted speech transcription data record comprises digitally signing the trusted speech transcription data record.

In example 26, the subject matter of any of examples 23 or 24 or 25 may further include that recording the signal of audible speech comprises recording a fragment of the signal representing audible speech and wherein the digital audio recording is a recording of the fragment of the audible speech, the fragment of the audible speech representative of a source of the audible speech and corresponding to the transcribed speech.

Figure 7:
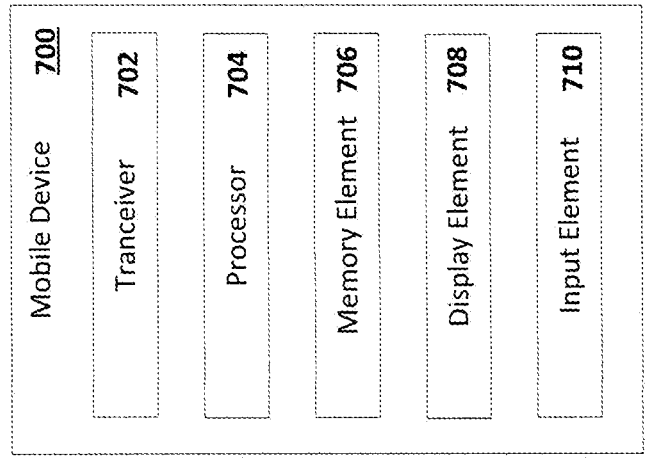
FIG. 7 is a schematic block diagram of a mobile device in accordance with embodiments of the present disclosure.
Figure 6:
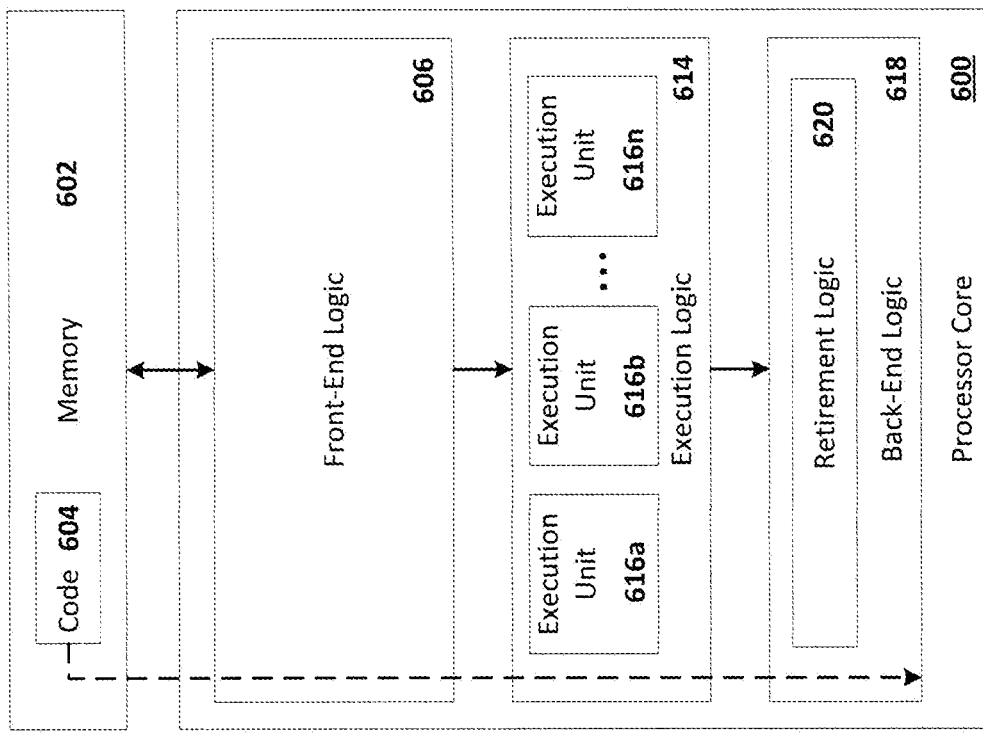
FIG. 6 is an example illustration of a processor according to an embodiment of the present disclosure.
Figure 8:
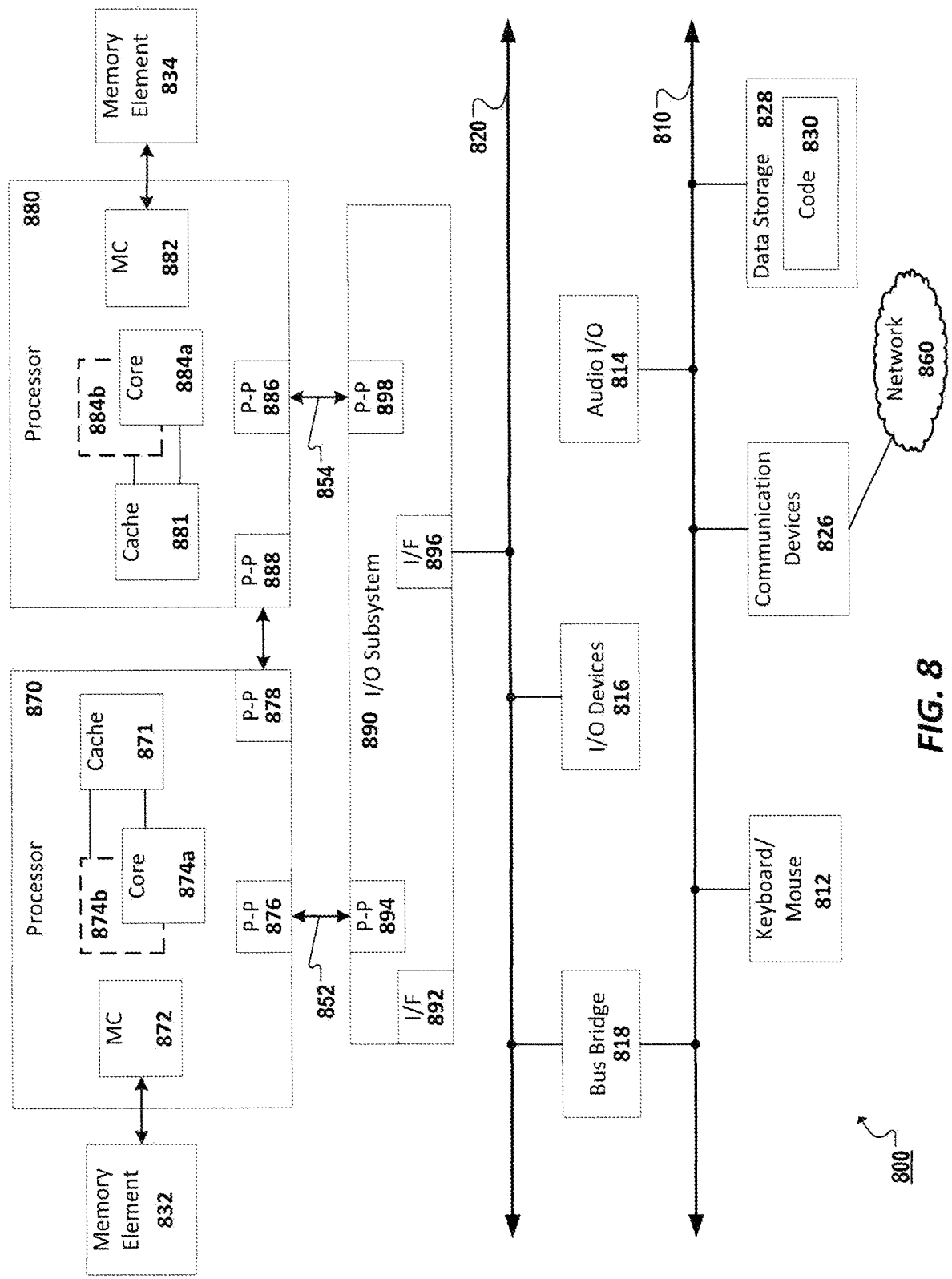
FIG. 8 is a schematic block diagram of a computing system 800 according to an embodiment of the present disclosure.

FIGS. 6-8 are block diagrams of exemplary computer architectures that may be used in accordance with embodiments disclosed herein. Other computer architecture designs known in the art for processors, mobile devices, and computing systems may also be used. Generally, suitable computer architectures for embodiments disclosed herein can include, but are not limited to, configurations illustrated in FIGS. 6-8.

FIG. 6 is an example illustration of a processor according to an embodiment. Processor 600 is an example of a type of hardware device that can be used in connection with the implementations above.

Processor 600 may be any type of processor, such as a microprocessor, an embedded processor, a digital signal processor (DSP), a network processor, a multi-core processor, a single core processor, or other device to execute code. Although only one processor 600 is illustrated in FIG. 6, a processing element may alternatively include more than one of processor 600 illustrated in FIG. 6. Processor 600 may be a single-threaded core or, for at least one embodiment, the processor 600 may be multi-threaded in that it may include more than one hardware thread context (or "logical processor") per core.

FIG. 6 also illustrates a memory 602 coupled to processor 600 in accordance with an embodiment. Memory 602 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 600 can execute any type of instructions associated with algorithms, processes, or operations detailed herein. Generally, processor 600 can transform an element or an article (e.g., data) from one state or thing to another state or thing.

Code 604, which may be one or more instructions to be executed by processor 600, may be stored in memory 602, or may be stored in software, hardware, firmware, or any suitable combination thereof, or in any other internal or external component, device, element, or object where appropriate and based on particular needs. In one example, processor 600 can follow a program sequence of instructions indicated by code 604. Each instruction enters a front-end logic 606 and is processed by one or more decoders 608. The decoder may generate, as its output, a micro operation such as a fixed width micro operation in a predefined format, or may generate other instructions, microinstructions, or control signals that reflect the original code instruction. Front-end logic 606 also includes register renaming logic 610 and scheduling logic 612, which generally allocate resources and queue the operation corresponding to the instruction for execution.

Processor 600 can also include execution logic 614 having a set of execution units 616a, 616b, 616n, etc. Some embodiments may include a number of execution units dedicated to specific functions or sets of functions. Other embodiments may include only one execution unit or one execution unit that can perform a particular function. Execution logic 614 performs the operations specified by code instructions.

After completion of execution of the operations specified by the code instructions, back-end logic 618 can retire the instructions of code 604. In one embodiment, processor 600 allows out of order execution but requires in order retirement of instructions. Retirement logic 620 may take a variety of known forms (e.g., re-order buffers or the like). In this manner, processor 600 is transformed during execution of code 604, at least in terms of the output generated by the decoder, hardware registers and tables utilized by register renaming logic 610, and any registers (not shown) modified by execution logic 614.

Although not shown in FIG. 6, a processing element may include other elements on a chip with processor 600. For example, a processing element may include memory control logic along with processor 600. The processing element may include I/O control logic and/or may include I/O control logic integrated with memory control logic. The processing element may also include one or more caches. In some embodiments, non-volatile memory (such as flash memory or fuses) may also be included on the chip with processor 600.

Referring now to FIG. 7, a block diagram is illustrated of an example mobile device 700. Mobile device 700 is an example of a possible computing system (e.g., a host or endpoint device) of the examples and implementations described herein. In an embodiment, mobile device 700 operates as a transmitter and a receiver of wireless communications signals. Specifically, in one example, mobile device 700 may be capable of both transmitting and receiving cellular network voice and data mobile services. Mobile services include such functionality as full Internet access, downloadable and streaming video content, as well as voice telephone communications.

Mobile device 700 may correspond to a conventional wireless or cellular portable telephone, such as a handset that is capable of receiving "3G", or "third generation" cellular services. In another example, mobile device 700 may be capable of transmitting and receiving "4G" mobile services as well, or any other mobile service.

Examples of devices that can correspond to mobile device 700 include cellular telephone handsets and smartphones, such as those capable of Internet access, email, and instant messaging communications, and portable video receiving and display devices, along with the capability of supporting telephone services. It is contemplated that those skilled in the art having reference to this specification will readily comprehend the nature of modern smartphones and telephone handset devices and systems suitable for implementation of the different aspects of this disclosure as described herein. As such, the architecture of mobile device 700 illustrated in FIG. 7 is presented at a relatively high level. Nevertheless, it is contemplated that modifications and alternatives to this architecture may be made and will be apparent to the reader, such modifications and alternatives contemplated to be within the scope of this description.

In an aspect of this disclosure, mobile device 700 includes a transceiver 702, which is connected to and in communication with an antenna. Transceiver 702 may be a radio frequency transceiver. Also, wireless signals may be transmitted and received via transceiver 702. Transceiver 702 may be constructed, for example, to include analog and digital radio frequency (RF) 'front end' functionality, circuitry for converting RF signals to a baseband frequency, via an intermediate frequency (IF) if desired, analog and digital filtering, and other conventional circuitry useful for carrying out wireless communications over modern cellular frequencies, for example, those suited for 3G or 4G communications. Transceiver 702 is connected to a processor 704, which may perform the bulk of the digital signal processing of signals to be communicated and signals received, at the baseband frequency. Processor 704 can provide a graphics interface to a display element 708, for the display of text, graphics, and video to a user, as well as an input element 710 for accepting inputs from users, such as a touchpad, keypad, roller mouse, and other examples. Processor 704 may include an embodiment such as shown and described with reference to processor 600 of FIG. 6.

In an aspect of this disclosure, processor 704 may be a processor that can execute any type of instructions to achieve the functionality and operations as detailed herein. Processor 704 may also be coupled to a memory element 706 for storing information and data used in operations performed using the processor 704. Additional details of an example processor 704 and memory element 706 are subsequently described herein. In an example embodiment, mobile device 700 may be designed with a system-on-a-chip (SoC) architecture, which integrates many or all components of the mobile device into a single chip, in at least some embodiments.

FIG. 8 is a schematic block diagram of a computing system 800 according to an embodiment. In particular, FIG. 8 shows a system where processors, memory, and input/output devices are interconnected by a number of point-to-point interfaces. Generally, one or more of the computing systems described herein may be configured in the same or similar manner as computing system 800.

Processors 870 and 880 may also each include integrated memory controller logic (MC) 872 and 882 to communicate with memory elements 832 and 834. In alternative embodiments, memory controller logic 872 and 882 may be discrete logic separate from processors 870 and 880. Memory elements 832 and/or 834 may store various data to be used by processors 870 and 880 in achieving operations and functionality outlined herein.

Processors 870 and 880 may be any type of processor, such as those discussed in connection with other figures. Processors 870 and 880 may exchange data via a point-to-point (PtP) interface 850 using point-to-point interface circuits 878 and 888, respectively. Processors 870 and 880 may each exchange data with a chipset 890 via individual point-to-point interfaces 852 and 854 using point-to-point interface circuits 876, 886, 894, and 898. Chipset 890 may also exchange data with a high-performance graphics circuit 838 via a high-performance graphics interface 839, using an interface circuit 892, which could be a PtP interface circuit. In alternative embodiments, any or all of the PtP links illustrated in FIG. 8 could be implemented as a multi-drop bus rather than a PtP link.

Chipset 890 may be in communication with a bus 820 via an interface circuit 896. Bus 820 may have one or more devices that communicate over it, such as a bus bridge 818 and I/O devices 816. Via a bus 810, bus bridge 818 may be in communication with other devices such as a keyboard/mouse 812 (or other input devices such as a touch screen, trackball, etc.), communication devices 826 (such as modems, network interface devices, or other types of communication devices that may communicate through a computer network 860), audio I/O devices 814, and/or a data storage device 828. Data storage device 828 may store code 830, which may be executed by processors 870 and/or 880. In alternative embodiments, any portions of the bus architectures could be implemented with one or more PtP links.

The computer system depicted in FIG. 8 is a schematic illustration of an embodiment of a computing system that may be utilized to implement various embodiments discussed herein. It will be appreciated that various components of the system depicted in FIG. 8 may be combined in a system-on-a-chip (SoC) architecture or in any other suitable configuration capable of achieving the functionality and features of examples and implementations provided herein.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the claims.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A trusted speech transcription apparatus for creating a trusted speech transcription data record, the apparatus comprising:
   transcription logic implemented at least partially in hardware to receive a signal of audible speech from an audio source and to convert the signal of audible speech into text;
   sampling logic implemented at least partially in hardware to receive the signal of the audible speech and to record the signal of the audible speech as a digital audio recording of the audible speech;
   packaging logic implemented at least partially in hardware in a trusted execution environment to identify a speaker of the audible speech and to create the trusted speech transcription data record, wherein the trusted speech transcription data record is a single file that includes a portion of the text, a corresponding portion of the digital audio recording, the identity of the speaker, and a digital signature that uses a digital encryption key; and activation logic to receive the signal of audible speech and to activate the transcription logic and the sampling logic upon detecting one or more of:
a predetermined word or phrase within the signal of audible speech;
a signal quality of the signal of audible speech satisfying a clarity parameter;
an identification of a specific speaker of the audible speech, from the signal of audible speech; or
a duration of the audible speech exceeds a threshold duration.

2. The apparatus of claim 1, wherein the packaging logic further tags the trusted speech transcription data record with metadata associated with the audible speech.

3. The apparatus of claim 2, wherein the metadata comprises one or more of a time stamp, an internet protocol (IP) address of the audio source, an identification of a speaker of the audible speech, or an identifier of the source of the audible speech.

4. The apparatus of claim 1, wherein the transcription logic converts the signal of the audible speech and the sampling logic records the signal of audible speech in parallel.

5. The apparatus of claim 1, wherein the sampling logic records a fragment of the signal of audible speech and the digital audio recording is a recording of the fragment of the audible speech, the fragment of the audible speech representative of a source of the audible speech, and wherein the trusted speech transcription data record further includes the fragment of the audible speech.

6. The apparatus of claim 5, wherein the fragment of the audible speech comprises quality characteristics to identify a speaker of the audible speech.

7. The apparatus of claim 5, wherein the fragment of the audible speech is stored with a corresponding transcription of the audible speech.

8. A computer program product tangibly embodied on a non-transitory computer readable medium, the computer program product including instructions that, when executed by a processing element causes the processing element to:
receive an electronic signal of audible speech from an audio source;
upon detecting one or more of:
a predetermined word or phrase within the electronic signal of audible speech;
a signal quality of the electronic signal of audible speech satisfying a clarity parameter;
an identification of a specific speaker of the audible speech, from the electronic signal of audible speech; or
a duration of the audible speech exceeds a threshold duration;
convert the electronic signal of audible speech into digital text; and
record the electronic signal of audible speech as a digital audio recording of the audible speech;
identify a speaker of the audible speech; and
create, in a trusted execution environment, a trusted speech transcription data record, wherein the trusted speech transcription data record is a single file that includes the digital text, the digital audio recording, the identity of the speaker, and a digital signature.

9. The computer program product of claim 8, wherein instructions are further operable to tag the trusted speech transcription data record with metadata associated with the audible speech.

10. The computer program product of claim 9, wherein the metadata comprises one or more of a time stamp, an internet protocol (IP) address of the audio source, an identification of a speaker of the audible speech, or an identifier of the source of the audible speech.

11. The computer program product of claim 8, wherein the instructions are further operable to convert the electronic signal of the audible speech and to record the electronic signal of audible speech in parallel.

12. The computer program product of claim 8, wherein instructions are further operable to record a fragment of the electronic signal of audible speech and the digital audio recording is a recording of the fragment of the audible speech, the fragment of the audible speech representative of a source of the audible speech, and wherein the trusted speech transcription data record further includes the fragment of the audible speech.

13. The computer program product of claim 12, wherein the fragment of the audible speech comprises quality characteristics to identify a speaker of the audible speech.

14. The computer program product of claim 12, wherein the fragment of the audible speech is stored with a corresponding transcription of the audible speech.

15. A method comprising:
receiving an electronic signal of audible speech from an audio source;
identifying at least a portion of the audible speech that includes identification cues of the identity of a speaker of the audible speech;
upon detecting one or more of:
a predetermined word or phrase within the electronic signal of audible speech;
a signal quality of the electronic signal of audible speech satisfying a clarity parameter;
an identification of a specific speaker of the audible speech, from the electronic signal of audible speech; or
a duration of the audible speech exceeds a threshold duration;
converting the electronic signal into digital text; and
recording the electronic signal of audible speech as a digital audio recording of the audible speech; and
creating, in a trusted execution environment, a trusted speech transcription data record, wherein the trusted speech transcription data record is a single file that includes the digital text, the digital audio recording, the identity of the speaker, and a digital signature.

16. The method of claim 15, wherein recording the electronic signal of audible speech comprises recording a fragment of the audible speech, wherein the digital audio recording is a recording of the fragment of the audible speech, wherein the fragment of the audible speech is representative of a source of the audible speech and corresponds to the transcribed speech, and wherein the trusted speech transcription data record further includes the fragment of the audible speech.

* * * * *